(12) United States Patent
Shinkai

(10) Patent No.: US 7,474,325 B2
(45) Date of Patent: Jan. 6, 2009

(54) VIDEO TELEPHONE AND COMPUTER PROGRAM

(75) Inventor: Yasuhiro Shinkai, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 723 days.

(21) Appl. No.: 10/949,197

(22) Filed: Sep. 27, 2004

(65) Prior Publication Data
US 2005/0083399 A1 Apr. 21, 2005

(30) Foreign Application Priority Data
Sep. 25, 2003 (JP) ............................. 2003-333051
Sep. 2, 2004 (JP) ............................. 2004-256339

(51) Int. Cl.
H04N 7/14 (2006.01)
H04M 11/00 (2006.01)
(52) U.S. Cl. ............... 348/14.01; 348/14.08; 348/14.02
(58) Field of Classification Search ... 348/14.01–14.09, 348/14.1, 14.11, 14.12, 14.13
See application file for complete search history.

(56) References Cited
FOREIGN PATENT DOCUMENTS

| JP | 402022986 A | * | 1/1990 |
| JP | 407030871 A | * | 1/1995 |
| JP | 407038863 A | * | 2/1995 |
| JP | 07074806 A | * | 3/1995 |
| JP | 08-265450 | * | 10/1996 |
| JP | 09-102942 | * | 4/1997 |
| JP | 02003125457 A | * | 4/2003 |

OTHER PUBLICATIONS

DoCoMo Net-Products-FOMA Lineup, http://www.nttdocomo.co.jp/english/p_s/products/foma/home.html, date: 2005, Mrk Sep. 8, 2008.

* cited by examiner

Primary Examiner—Melur Ramakrishnaiah
(74) Attorney, Agent, or Firm—Sughrue Mion, PLLC

(57) ABSTRACT

A call by a video telephone can be made appropriately. A video telephone for transmitting and receiving a voice and an image comprising: an imaging unit for picking up an image of a speaker who speaks by a video telephone; a displaying unit for displaying an image of the speaker that is picked up by the imaging unit before starting to call when a video telephone receives an incoming call; and a transmitting unit for transmitting an image, which the imaging unit is picking up together with a voice of a speaker to a video telephone of an opposite party in a state that speaking is being made.

15 Claims, 8 Drawing Sheets

VIDEO TELEPHONE AND COMPUTER PROGRAM

BACKGROUND OF THE INVENTION

1. Field of the Invention

The present invention relates to a video telephone and a computer program. More particularly, the present invention relates to a video telephone and a computer program for transmitting and receiving a voice and an image.

2. Description of the Related Art

Recent years, it is possible that a dynamic image is transmitted by a radio communication due to the rapid progress of communication performance according to the various high-speed radio standards for example IMT-2000 or adopting MPEG-4 which is excellent in tolerance to errors and has a high compression efficiency. In addition, LSI, which has small mounting area and power consumption and is loaded with all functions required by a portable telephone, is developed for a portable telephone and the function of a video telephone of communicating while looking at the opposite party in real time is embodied in a portable telephone by having a camera and an LCD while maintaining the compactness of a portable telephone. (cf.http://foma.nttdocomo.co.jp/enqlish/index.html)

A conventional fixed telephone is always fixed on a prescribed position so that, in case of using a video telephone function, there is no concern that things which a speaker does not want to show to the opposite party are included in the background by installing them on a position where the opposite party cannot see. However, while a portable telephone has advantages of enabling to make a call at any time and any place, there is concern that things, which a speaker does not want to show to the opposite party, are included in the background in case of using the video telephone function. For example, in case of receiving a call in the untidy room or receiving a call from a client while traveling, the speaker does not want to show his figure to the opposite party. As above, in case that the video telephone function is performed by the portable telephone, there is a drawback that the speaker must call with concern about the condition of circumstances.

SUMMARY OF THE INVENTION

Therefore, it is one of the objects of the present invention to provide a video telephone and a computer program, which is capable of overcoming the above drawbacks accompanying the conventional art. The above and other objects can be achieved by a combination of features described in each independent claim. The dependent claims define further advantageous example of the present invention.

According to a first aspect of the present invention, a video telephone for transmitting and receiving a voice and an image comprising: an imaging unit for picking up an image of a speaker who speaks by the video telephone; a displaying unit for displaying an image of a speaker that is picked up by the imaging unit before starting to call when the video telephone receives an incoming call; and a transmitting unit for transmitting an image which the imaging unit is picking up, together with a voice of the speaker to a video telephone of an opposite party in a state that the speaking is made.

Moreover, the video telephone may further include a selecting unit for selecting whether only a voice call is to be made without transmitting an image which is picked up by the imaging unit or with transmitting an image, in a state that the displaying unit displays the image of the speaker. The video telephone may be a portable telephone.

In addition, the video telephone is foldable with the displaying unit located on its inner side, and the displaying unit may display the image of the speaker, which is picked up by the imaging unit, in response to opening the video telephone when the video telephone receives an incoming call in a folded state.

Moreover, the video telephone may further include an opposite party identifying unit for identifying whether an opposite party is a voice telephone for transmitting a voice without being accompanied by an image or a video telephone, and the displaying unit may display an image of the speaker, the image having been picked up by the imaging unit when the speaking was not made, in case that the opposite party identifying unit identifies the opposite party as a video telephone.

In addition, the video telephone may further include an opposite party identifying unit for identifying an opposite party, and the transmitting unit may transmit the image which is picked up by the imaging unit to the video telephone of an opposite party on condition that the opposite party is a previously registered opposite party.

The video telephone may further include a clock unit for confirming an incoming call time of the video telephone, and the transmitting unit may transmit an image which is picked up by the imaging unit to the video telephone of an opposite party on condition that an incoming call time is a previously registered time band.

The video telephone may further include a position measuring unit for measuring a present position of the video telephone, and the transmitting unit may transmit the image which is picked up by the imaging unit to the video telephone of an opposite party on condition that a present position of receiving an incoming call is within a previously registered area.

The video telephone may further include an image recognizing unit for recognizing the image which is picked up by the imaging unit, and the transmitting unit transmits an image which is picked up by the imaging unit to the video telephone of an opposite party on condition that the image recognizing unit recognizes that an image, which is picked up by the imaging unit, includes a previously registered image.

Moreover, the video telephone may further include an image extracting unit for extracting the image of the speaker from an image which is picked up by the imaging unit; a background storing unit for storing a background image which is to be synthesized with the image of the speaker; and an image synthesizing unit for generating a synthesized image in which an image of the speaker extracted by the image extracting unit is synthesized with the background image stored by the background storing unit, the displaying unit may display the synthesized image before starting the speaking, and the transmitting unit may transmit the synthesized image to a video telephone of the opposite party in a state that the call is being made.

The video telephone may further include an opposite party identifying unit for identifying an opposite party, and the image synthesizing unit may generate the synthesized image if an opposite party is one previously registered.

The video telephone may further include a clock unit for confirming an incoming call time of the video telephone, and the image synthesizing unit may generate a synthesized image in case that an incoming call time is a previously registered time band.

The video telephone may further include a position measuring unit for measuring a present position of the video telephone, and the image synthesizing unit may generate the synthesized image if a present position of receiving an incoming call is within a previously registered area.

The video telephone may further comprising an image recognizing unit for recognizing the image which is picked up by the imaging unit, and the image synthesizing unit may generate the synthesized image if the image recognizing unit recognizes that an image, which is picked up by the imaging unit, includes a previously registered image.

According to a second aspect of the present invention, a computer program which makes a video telephone operate, the video telephone transmitting and receiving a voice and an image. The computer program may make the video telephone function as an imaging unit for picking up an image of a speaker who speaks by the video telephone; a displaying unit for displaying an image of the speaker that is picked up by the imaging unit before speaking is started when the video telephone receives an incoming call; and a transmitting unit for transmitting an image which the imaging unit is picking up, together with a voice of the speaker to a video telephone of an opposite party in a state that the speaking is being made.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiments are not necessarily essential to the invention.

Figure 1:
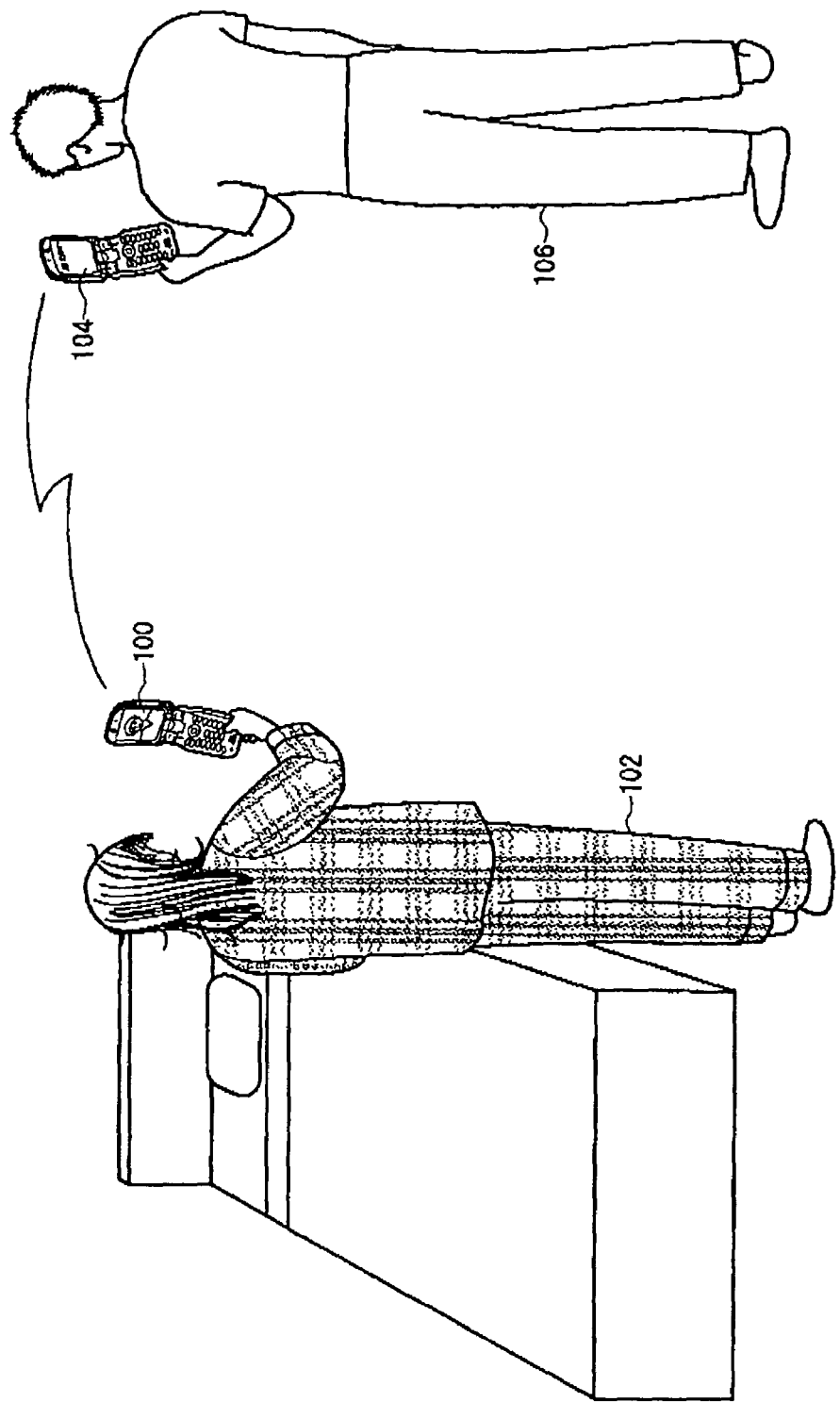
FIG. 1 shows an example of a situation of using the portable telephone 100.

FIG. 1 shows an example of a situation of using the portable telephone 100 according to an embodiment of the present invention. The portable telephone 100 is an example of the video telephone for transmitting and receiving a voice and an image Moreover, a user 102 is a speaker who calls using the portable telephone 100.

In case of receiving an incoming call from another portable telephone 104, the portable telephone 100 picks up the image of the user 102 and displays it to the display of the portable telephone 100 before starting to speak. For this reason, the user 100 can determine whether or not he/she replies to the incoming call from the portable telephone 104 after confirming the figure of himself/herself appeared on the display. For example, in case that the user 102 receives an incoming call from the portable telephone 104 when he/she gets up or lies down, the user 102 may not want to show his/her figure to the user 106 of the video telephone 104. In this case, the user 102 can conceal his/her figure from the user 106 by not replying to the call.

Here, it can be conceived that the user 102 starts to speak by only the voice without transmitting the image when he/she is concerned about showing his/her figure. However, in this case, any inconvenience, for example, that the user 106 asks why the image is not transmitted, may be caused.

However, according to the present example, the call by the video telephone can be started at ease because the user can determine whether or not he/she starts to speak after confirming the figure of himself/herself. For this reason, according to the present example, the call by the video telephone can be made appropriately.

Moreover, in the present example, the portable telephone 100 is foldable with the display located on its inner side. When the portable telephone 100 receives an incoming call in a folded state, the display displays the image of the user 102 in response to opening the portable telephone 100 from the folded state. For this reason, for example, when the user 102 is away from the portable telephone 100, the portable telephone 100 can omit displaying the image of the user 102. Moreover, according to this, the power consumption of the portable telephone 100 can be reduced.

Figure 2:
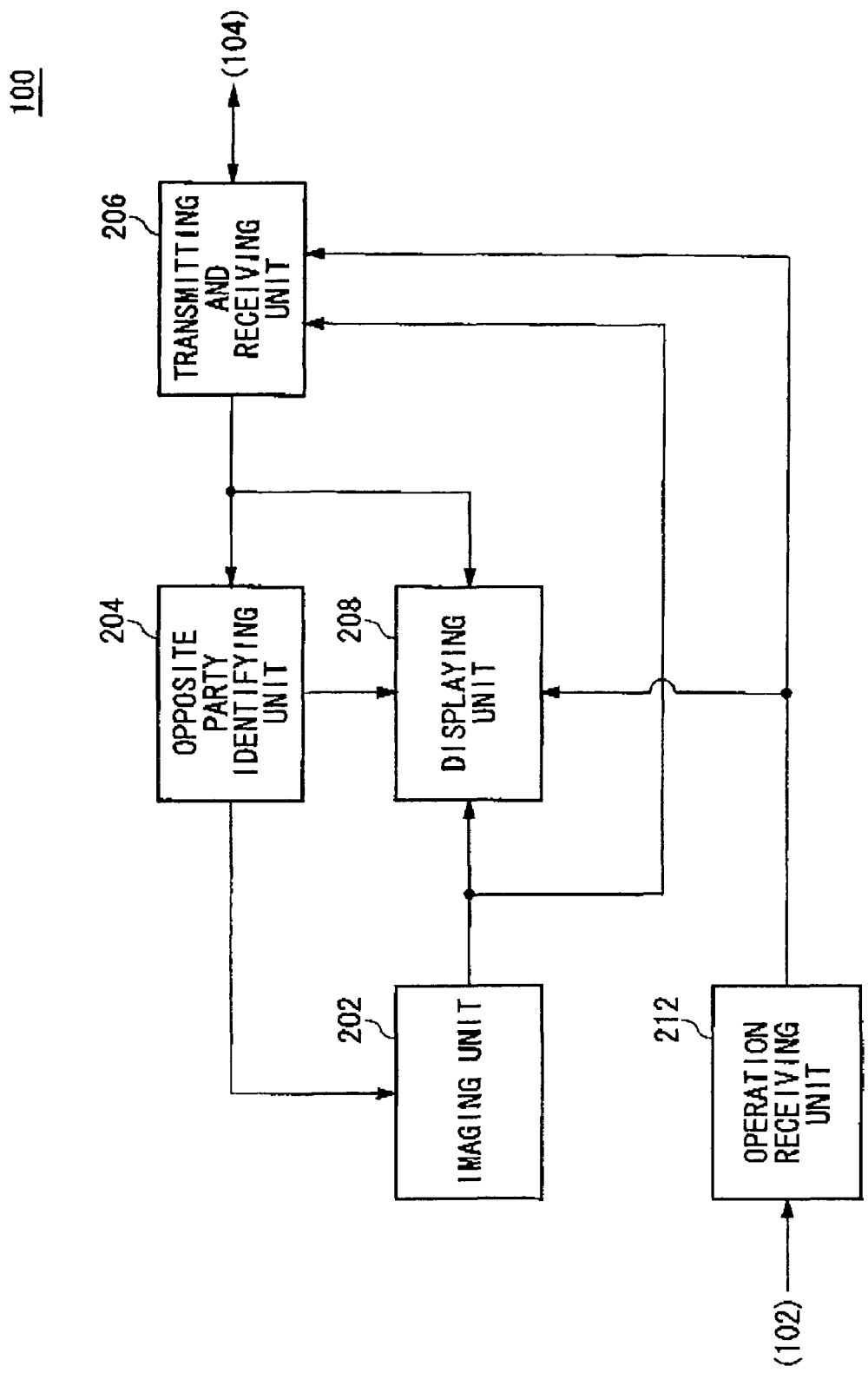
FIG. 2 is a block diagram showing a first embodiment of the functional constitution of the portable telephone 100.

FIG. 2 shows a first embodiment of the functional constitution of the portable telephone 100. In the present example, the portable telephone 100 includes an operation receiving unit 212, a transmitting and receiving unit 206, an opposite party identifying unit 204, an imaging unit 202 and a displaying unit 208. The operation receiving unit 212 receives a direction from the user 102 by the button operation of the user 102 to the keyboard of the portable telephone 100. For example, the operation receiving unit 212 receives a direction of on-hook operation for starting a call by predetermined button operation of the user 102. Moreover, in the present example, the operation receiving unit 212 detects the operation of the user 102 opening the portable telephone 100 in a folded state.

The transmitting and receiving unit 206 transmits and receives the signal to/from another portable telephone 104 via, for example, the base station. For example, in case that the portable telephone 100 functions as the video telephone to speak with the portable telephone 104, the transmitting and receiving unit 206 transmits and receives a voice and an image signals after starting to speak. In this case, the transmitting and receiving unit 206 transmits the voice signal, which is received from the microphone of the portable telephone 100, to the portable telephone 104 of the opposite party. Moreover, the transmitting and receiving unit 206 drives a speaker of the portable telephone 100 in response to the voice signal that is received from the portable telephone 104.

In addition, the transmitting and receiving unit 206 transmits the image signal to the portable telephone 104 based on the image of the user 102, which is picked up by the imaging unit 202. The transmitting and receiving unit 206 provides the image, which is based on the image signal received from the portable telephone 104, for the displaying unit 208. In case that the portable telephone 100 calls as the voice telephone for transmitting and receiving a voice without an image, the transmitting and receiving unit 206 transmits and receives the voice signal.

The opposite party identifying unit 204 identifies whether the opposite party is a voice telephone or a video telephone, based on the communication protocol defined by the carrier that provides a portable telephone network.

The imaging unit 202 is a camera module integrated into the portable telephone 100 and picks up an image of the user 102. The imaging unit 202 may pickup an image of the speaker who speaks using the portable telephone 100. Between receiving an incoming call of the portable telephone 100 and starting to speak, the imaging unit 202 provides the picked-up image of the user 102 for the displaying unit 208. Moreover, after starting to speak, the imaging unit 202 provides the picked-up image of the user 102 for the transmitting and receiving unit 206. The imaging unit 202 may generate the dynamic image to photograph the user 102 as the image of the user 102.

The displaying unit 208 is a display of the portable telephone 100. Between receiving a call of the portable telephone 100 and starting to speak, the displaying unit 208 displays the image of the user 102, which is picked up by the imaging unit 202, with the display of the incoming call. The displaying unit may display the image of the user 102 in a state that the speaking is not being made. Moreover, the displaying unit 208 displays the image based on the image signal which is received from the portable telephone 104 after starting to speak. In this case, the displaying unit 20B may display the image of the user 106 of the portable telephone 104. For this reason, according to the present example, the call by the video telephone can be made appropriately.

Moreover, between receiving an incoming call and starting to speak, the displaying unit 208 may display the image of the user 102 in case that the opposite party identifying unit 204 identifies the opposite party as a video telephone. According to this, if not necessary, displaying the image of the user 102 is omitted and the power consumption of the portable telephone 100 can be reduced.

Moreover, in the present example, the operation receiving unit 212 selects either the video telephone or the voice telephone to call the portable telephone 104 according to the direction of the user. For example, in a state that the displaying unit 208 displays the image of the user 102, the operation receiving unit 212 selects whether the voice call is made without transmitting the image which is picked up by the imaging unit 202 or with transmitting the image. The operation receiving unit 212 is an example of a selecting unit.

Figure 3:
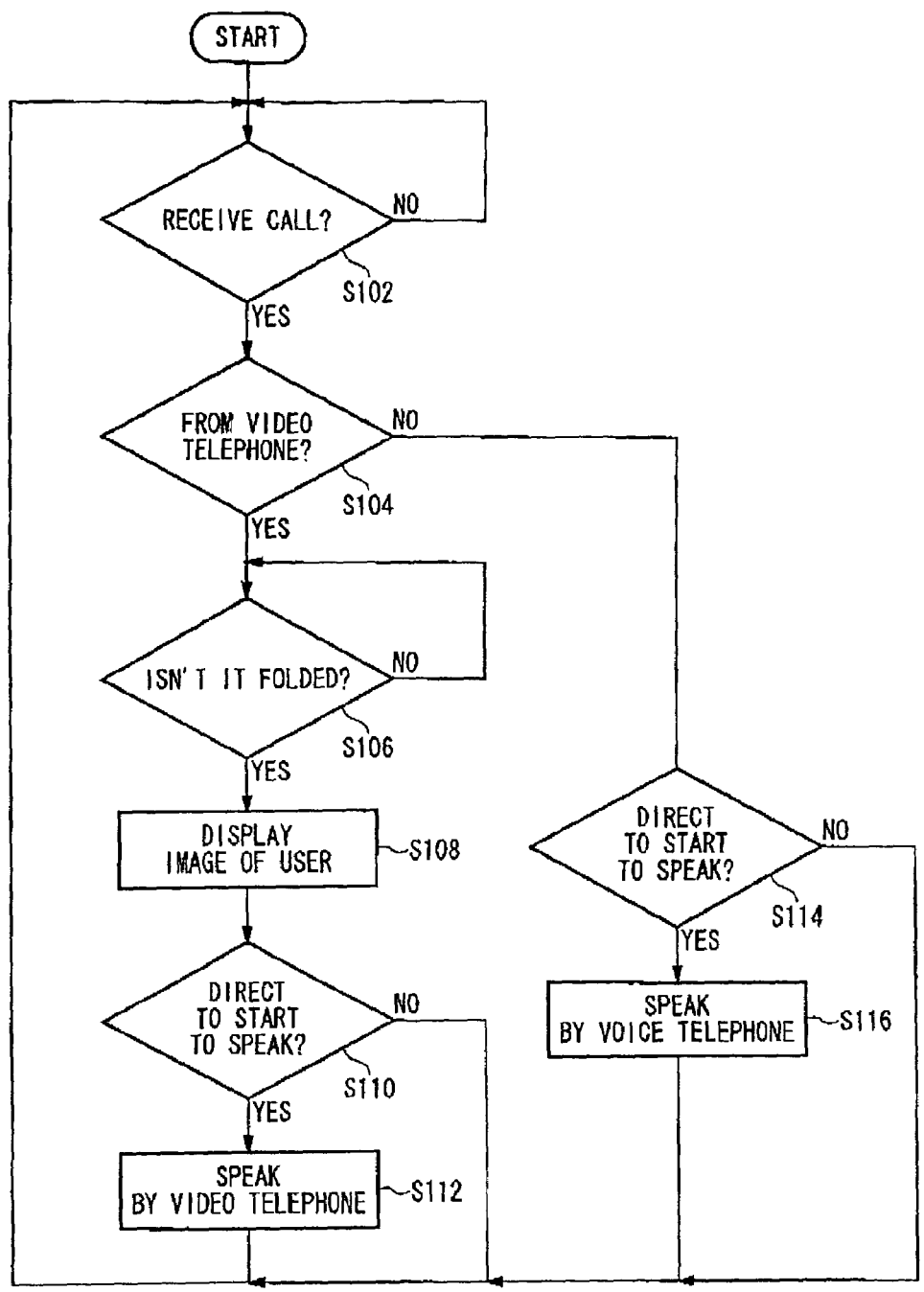
FIG. 3 is a flow chart showing an example of the operation of the portable telephone 100 shown in FIG. 2.

FIG. 3 shows a flow chart of an operation example of the portable telephone 100 shown in FIG. 2. The portable telephone 100 stands by until receiving an incoming call (S102 No). In case of receiving an incoming call (S102 Yes), the opposite party identifying unit 204 identifies whether or not the opposite party is a video telephone (S104). In case of the video telephone (S104 Yes), if the portable telephone 100 is not folded and the user 102 can seethe displaying unit 208 (S106 Yes), the displaying unit 208 displays the image of the user 102 which is picked up by the imaging unit 202 (S108). Accordingly, if the operation receiving unit 212 receives a direction for starting to speak from the user 102 (S110 Yes), the portable telephone 100, as the video telephone, starts to speak with the opposite party. In this case, the transmitting and receiving unit 206 transmits the image, which is picked up by the imaging unit 202, together with the voice of the user 102 to the portable telephone 104, which is the video telephone of the opposite party, after starting to speak. The transmitting and receiving unit 206 may transmit the image that is picked up by the imaging unit 202 to the portable telephone 104 in a state of speaking with the portable telephone 104.

Here, in case of identifying that the opposite party is not a video telephone (S104 No), the portable telephone 100, as the voice telephone without transmitting the image, starts to speak with the opposite party in response to the direction for starting to speak, which is received by the operation receiving unit 212 (S114 Yes).

Moreover, in case that the portable telephone 100 is folded (S106 No)after receiving an incoming call, the displaying unit 108 does not display the image of the user 102 until the portable telephone 100 is open. Moreover, in S110 and S114, the portable telephone 100 does not start to speak in case that the operation receiving unit 212 does not receive the direction for starting to speak. In this case, the portable telephone 100 waits for ending an incoming call, returns back to S102 and waits for the next incoming call. In addition, the portable telephone 100 returns back to S102 after ending the call in S112 and S116 and waits for the next incoming call.

Figure 4:
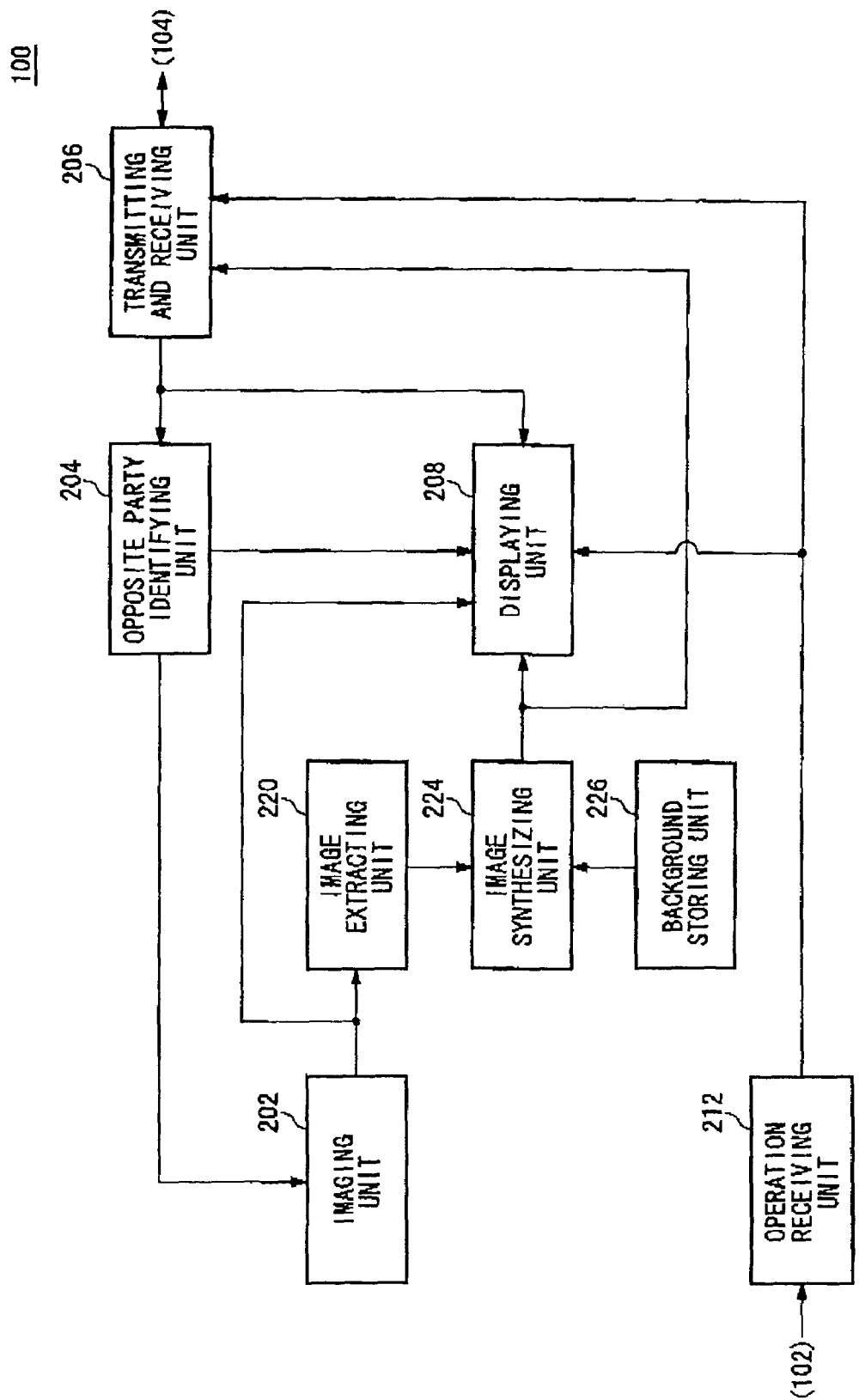
FIG. 4 is a block diagram showing a second embodiment of the functional constitution of the portable telephone 100.

FIG. 4 shows a second embodiment of the functional constitution of the portable telephone 100. In the present example, the portable telephone 100 replaces the background of the image, which is picked up by the imaging unit 202 in response to the direction of the user 102 and transmits to another portable telephone 104. The portable telephone 100 includes an imaging extracting unit 220, an imaging synthesizing unit 224 and a background storing unit 226 in addition to the configuration of the portable telephone 100 that is described in FIG. 2. Moreover, since the configuration in FIG. 4 attached the same symbol with FIG. 2 has the same function as that of FIG. 2, the description is omitted except the point as follows.

In the present example, the operation receiving unit 212 receives the direction, which shows whether or not the background of the image picked up by the imaging unit 202 is to be replaced, from the user 102. The image extraction unit 220 extracts the image of the user 102 from the image picked up by the imaging unit 202 according to the well-known technology by which an object is extracted based on the edges of the object. The image extracting unit 220 may extract the image of the user 102 from each frame of the dynamic image which is picked up by the imaging unit 202.

The background storing unit 226 stores the image of the background which is synthesized with the image of the user 102. The background storing unit 226 may store the image of a plurality of the background which is selected by the direction of the user, for example. The image synthesizing unit 224 generates the synthesized image in which the image of the user 102 extracted by the image extraction unit 220, is synthesized with the image of the background stored by the background storing unit 226. The image synthesizing unit 224 may generates the synthesized image in case that the operation receiving unit 212 receives the direction for replacing the background. The image synthesizing unit 224 selects a background image images which is stored by the background storing unit 226 and may synthesize with the image of the user 102. The image synthesizing unit 224 may generate the synthesized image to each frame of the dynamic images which are picked up sequentially by the imaging unit 202.

Between receiving an incoming call and starting to speak, the displaying unit 208 displays either the image picked up by the imaging unit 202 without modifying, or the synthesized image synthesized by the image synthesizing unit 224. For example, in case that the operation receiving unit 212 receives the direction for replacing the background, the displaying unit 208 displays the synthesized image before starting to speak. The displaying unit 208 may display the synthesized image in a state that the call is not being made.

Moreover, after starting to speak, the transmitting and receiving unit 206 transmits either the image picked up by the imaging unit 202 without modifying, or the synthesized image synthesized by the image synthesizing unit 224, to the portable telephone 104 of the opposite party in response to the direction which the operation receiving unit 212 receives from the user 102. For example, in case that the operation receiving unit 212 receives the direction for replacing the background, the transmitting and receiving unit 206 transmits the synthesized image to the portable telephone 104 after starting to speak. The transmitting and receiving unit 206 may transmit the synthesized image in a state that the call is not being made. According to the present example, in case of transmitting and receiving the image of which the background is replaced, the user can previously confirm the figure of himself/herself, which is photographed by the portable telephone 104 of the opposite party.

Figure 5:
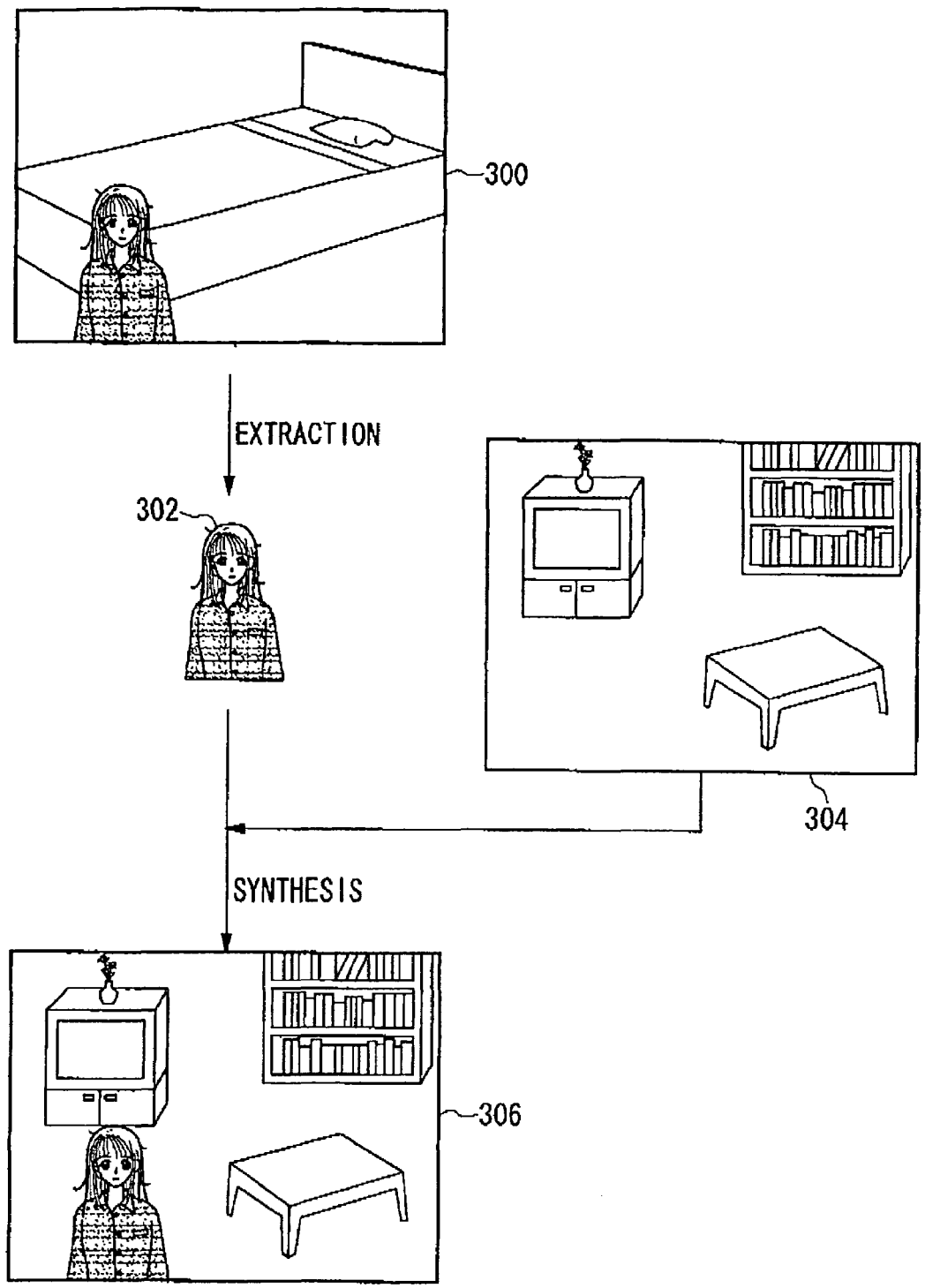
FIG. 5 is a flow chart showing an example of the operation of the portable telephone 100 shown in FIG. 4.

The FIG. 5 shows an example of the operation of the portable telephone 100 shown in FIG. 4. In the present example, the imaging unit 202 picks up an image 300 in response to receiving an incoming call of the portable telephone 100. The image extracting unit 220 extracts the image 302 of the user 102 from the image 300 in case that the operation receiving unit 212 receives the direction for replacing the background. The image synthesizing unit 224 synthesizes the image 302 with the image 304 stored by the background storing unit 226 and generates a synthesized image 306. According to the present example, the background picked up by the imaging unit 202 can be replaced appropriately.

Figure 6:
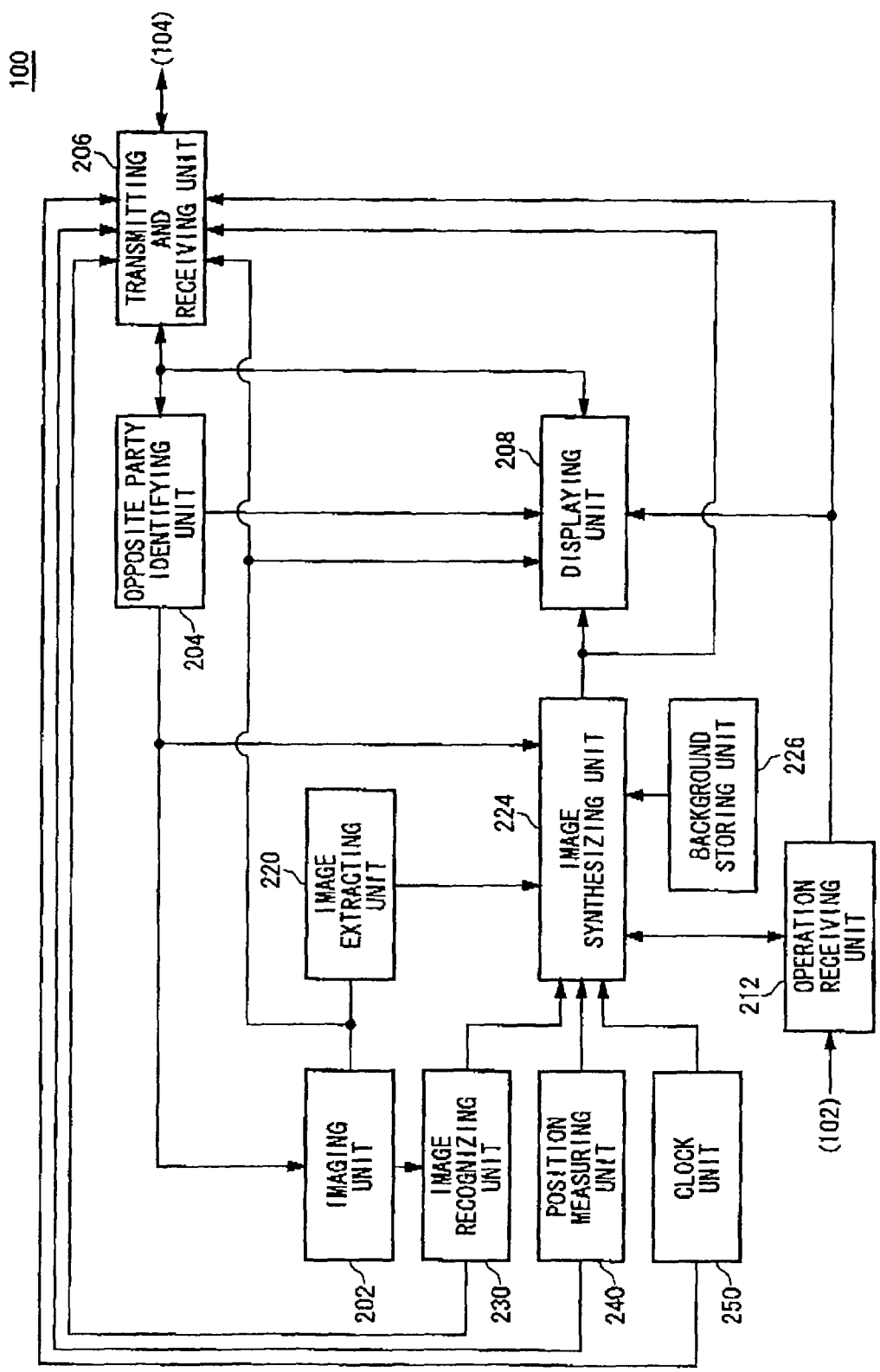
FIG. 6 is a block diagram showing a third embodiment of the functional constitution of the portable telephone 100.

FIG. 6 shows an example of a third embodiment of the functional constitution of the portable telephone 100. In case of receiving an incoming call of the video telephone, the portable telephone 100 in the present embodiment restricts transmission of the real-time image in case that at least one among the image, which is picked up by the imaging unit 202, the opposite party, the time band and the position is satisfied with the predetermined condition. The portable telephone 100 in the present embodiment includes an image recognizing unit 230, a position measuring unit 240 and a clock unit 250 in addition to the second embodiment shown in FIG. 4. The same constitution as that of the described embodiment is attached the same symbol and the description is omitted.

The opposite party identifying unit 204 in the present embodiment identifies the opposite party of an incoming call. The opposite party recognizing unit 204 identifies the opposite party by means of the telephone number of the opposite party notified by the transmitting and receiving unit 206 in case of receiving an incoming call. The transmitting and receiving unit 206 obtained the information to identify the opposite party from the opposite party recognizing unit 204. Moreover, the image which is picked up by the imaging unit 202 is transmitted to the video telephone of the opposite party in condition that the opposite party is a previously registered opposite party. According to this, whether or not the real-time image of the user is transmitted to the telephone of the opposite party can be determined previously in response to the opposite party.

The clock unit 250 confirms an incoming call time of the video telephone. The transmitting and receiving unit 206 obtains the present time of an incoming call of the video telephone from the clock unit 250. The image picked up by the imaging unit 202 is transmitted to the video telephone of the opposite party in condition that the incoming call time is in a previously registered time band. According to this, whether or not the real-time image of the user is transmitted to the telephone of the opposite party can be determined previously in response to the incoming call time.

Moreover, the position measuring unit 240 measures the present position of the portable telephone 100. The transmitting and receiving unit 206 obtains the present position of an incoming call of the video telephone from the position measuring unit 240. The image picked up by the imaging unit 202 is transmitted to the video telephone of the opposite party in condition that the position of the incoming call is within a previously registered the area. According to this, whether or not the real-time image of the user is transmitted to the telephone of the opposite party can be determined previously in response to the position of an incoming call.

In addition, the image recognizing unit 230 recognizes the image picked up by the imaging unit 202 and determines whether or not the image picked up by the imaging unit 202 includes a previously registered image. The transmitting and receiving unit 206 transmits the image picked up by the imaging unit 202 to the video telephone of the opposite party in condition that the image recognizing unit 230 determines that the image picked up by the imaging unit 202 includes a previously registered image. According to this, the portable telephone 100 can autonomously determine whether or not the real-time image of the user which is picked up by the imaging unit 202 is transmitted to the telephone of the opposite party in response to the condition of a previously determined image.

Moreover, the portable telephone 100 in the present embodiment can generate a background image, which is generated in FIG. 5, in case that one among the incoming call time, the present position, the opposite party, or the appearance is satisfied with the previously determined condition when the incoming call arrives to the video telephone. The user previously selects whether the portable telephone 100 is let to perform either an operation as above or an operation as follows.

The image synthesizing unit 224 obtains the information to identify the opposite party from the opposite party identifying unit 204 when the incoming call arrives. Accordingly, in the case that the opposite party is a previously registered opposite party, the synthesized image as above is synthesized. The description of the method for generating a synthesizing image is omitted because it is the same method as that described using FIG. 5. Moreover, the image synthesizing unit 224 obtains the present time from the clock unit 250 when the incoming call arrives to the video telephone. Accordingly, in the case that the incoming call time is a previously registered time band, the synthesized image is generated. Moreover, the image synthesizing unit 224 obtains the present position from the position measuring unit 240 when the incoming call arrives to the video telephone. Accordingly, in the case that the present position of an incoming call is within a previously registered area, the synthesized image is generated. In addition, the image synthesizing unit 224 inquires of the image recognizing unit 230 whether or not the image picked up by the imaging unit 202 includes a previously registered image. Accordingly, in case that the image recognizing unit 230 gives a reply that the image picked up by the imaging unit 202 includes a previously registered image, the synthesizing image is generated.

Figure 7:
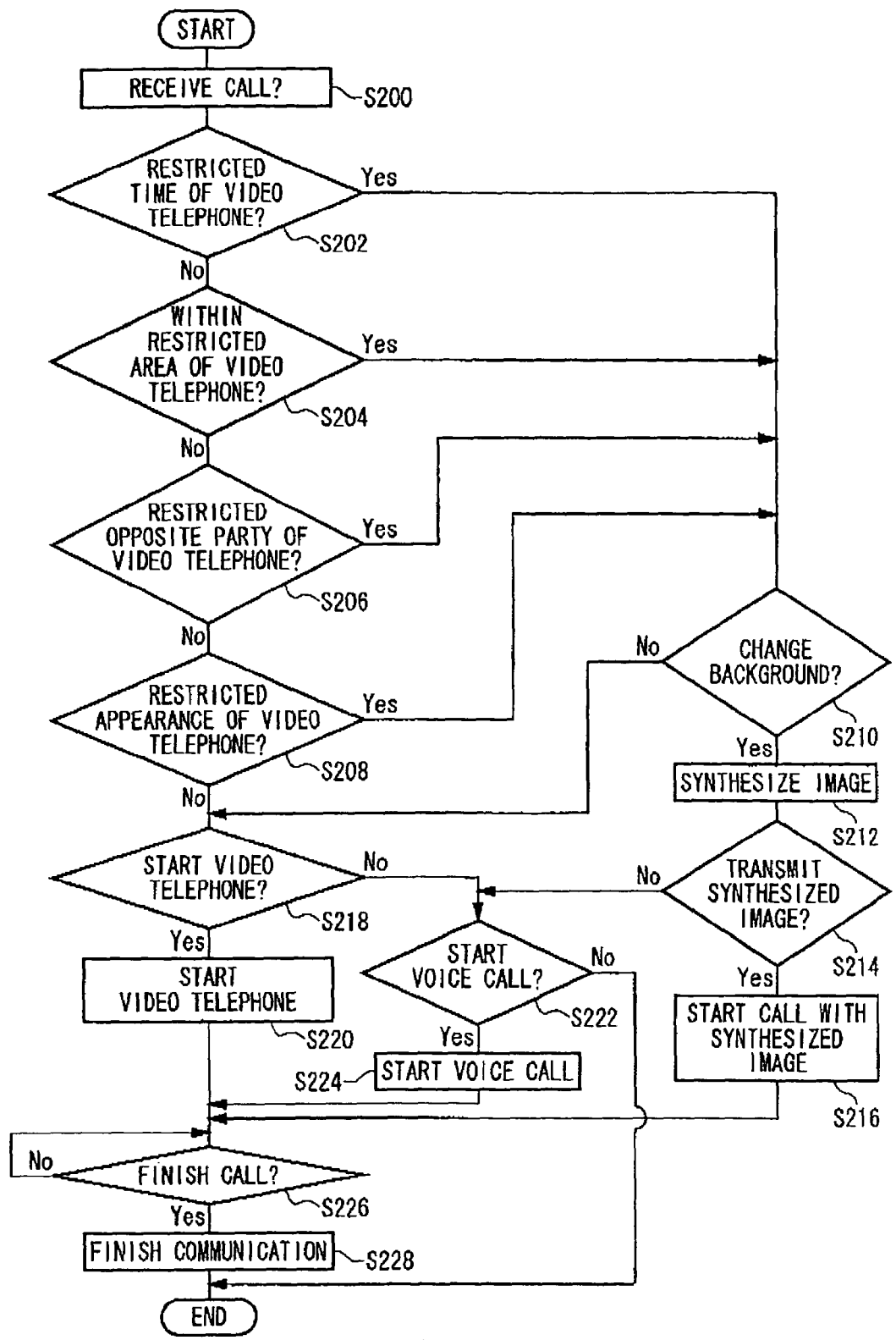
FIG. 7 is a flow chart showing an example of the operation the portable telephone 100 shown in FIG. 6.

FIG. 7 shows an operation of the portable telephone 100 in the present embodiment. First, the imaging unit 202 picks up the user 102 in response to the arrival of an incoming call to the portable telephone 100 (S200). Secondly, the image synthesizing unit 224 obtains the present time of an incoming call to the video telephone from the clock unit 250. Accordingly, it determines whether or not the incoming call time is a previously registered time band (S202). In the case that the incoming call time is not a restricted timeband (S202 No), the image synthesizing unit 224 obtains the present position from the position measuring unit 240. Accordingly, it determines whether or not the present position is within a previously registered the area (S204) In the case that the present position is not within a restricted area (S204 No), the image synthesizing unit 224 obtains the information to identify the opposite party from the opposite party identifying unit 204. Accordingly, it determines whether or not the opposite party is a restricted party (S206). In the case that the opposite party is not a restricted party (S206 No), the image synthesizing unit 224 inquires of the image recognizing unit 230 whether or not the image picked up by the imaging unit 202 includes the restricted appearance which is previously registered (S208).

The restricted appearance is an image that it is improper to transmit to the terminal of the opposite party. For example, the feature of an image which the user does not want to transmit to the terminal of the opposite party, such as an image in which colors of pajamas and body take up majority, is previously registered in the background storing unit 226 as a condition for the restricted appearance. The image synthesizing unit 224 may generate the synthesizing image in case that the user does not put on lipstick. For example, when the color of lips which is photographed in the imaging unit 202 is within a range of standard color of lips in the case that the lipstick is not being put on, the image recognizing unit 230 determines that the user does not put on lipstick. Moreover, the user may register the color of one's lips in case that the user does not put on lipstick. In this case, the image recognizing unit 230 determines that the user does not put on lipstick in case that the color of the user's lips photographed in the imaging unit 202 accords with the previously registered color of lips.

The image synthesizing unit 224 may generate the synthesizing image in the case that the user does not wear a necktie. For example, the image recognizing unit 230 recognizes the shirts' collar under the neck and recognizes whether or not there is a knot of the necktie under the recognized collar. The image recognizing unit 230 may look for an inverted triangular pattern under the recognized collar.

In the case that the image picked up by the imaging unit 202 does not include a restricted appearance (S208 No), the operation receiving unit 212 receives the selection of whether or not it starts to speak by the video telephone (S218). If the operation receiving unit 212 receives the selection to start to speak by the video telephone (S218 Yes), the transmitting and receiving unit 206 transmits the real-time image photographed by the imaging unit 202 and the voice data of the user to the terminal of the opposite party and starts the video telephone call (S220). On the other hand, if the operation receiving unit 212 receives the selection not to start to speak by the video telephone (S218 No), the operation receiving unit 212 receives the selection of whether or not it starts to speak by the voice telephone (S222). If the operation receiving unit 212 receives the selection to start to speak by the voice telephone (S222 Yes), the transmitting and receiving unit 206 starts the voice call (S224). On the other hand, if the operation receiving unit 212 receives the selection not to start the voice call (S222 No), this flow ends.

The image synthesizing unit 224 inquires of the user whether or not it changes the background image (S210) in the case that the incoming call is a restricted time band (S202 Yes), the present position is within a restricted area (S204 Yes), the opposite party is a restricted party (S206 Yes) or the image of the imaging unit 202 includes a restricted appearance (S208 Yes). In the case that the selection not to change the background is inputted (S210 No), it progresses to step 218. In the case that the selection to change the background is inputted (S210 Yes), the image synthesizing unit 224 generates the synthesized image as description in FIG. 5 (S212). In this case, the image synthesizing unit 224 may select the background image which is synthesized with the user image in response to one among the opposite party, the present position, the present time and the appearance of the user picked up by the imaging unit 202.

The displaying unit 208 displays the synthesized image which is generated by the image synthesizing unit 224 and inquires of the user whether or not it transmits the synthesized image to the portable telephone of the opposite party (S214). In the case that the selection not to transmit the synthesized image to the portable telephone of the opposite party (S214 No), it progresses to step 222. On the other hand, in the case that the selection to transmit the synthesized image to the portable telephone of the opposite party (S214 Yes), the transmitting and receiving unit 206 transmits the synthesized image and the voice data to the portable telephone of the opposite party and starts call (S216). Following the video telephone call starting in step 220, the voice call started in step 224 and the call by the synthesized image started in step 216, the operation receiving unit 212 receives the input of whether or not one finishes the call (S226). In the case that the selection to finish the call (S226 Yes), the transmitting and receiving unit 206 finishes the call (S228). This flow ends.

According to the flow as above, the portable telephone 100 autonomously inquires of the user whether or not it changes the background image in the case that one among the incoming call time, the present time, the opposite party and the appearance of the incoming call is satisfied with the predetermined condition when the incoming call arrives. Accordingly, the user lets the portable telephone 100 generate the synthesized image immediately without troublesome input in the case that the user wants to change the background image. Moreover, the call can be started immediately transmitting the synthesized image to the terminal of the opposite party.

Figure 8:
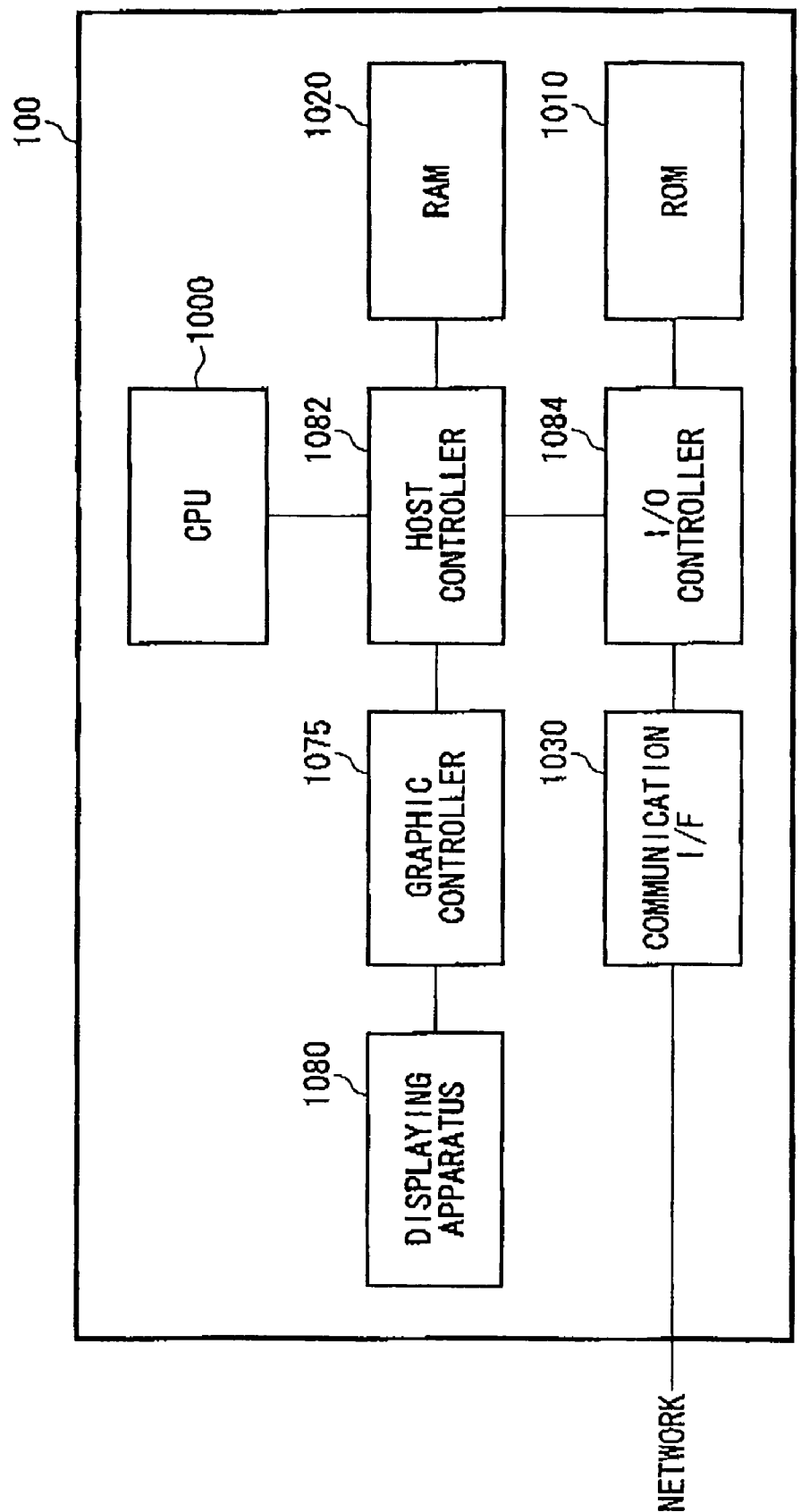
FIG. 8 shows an example of the hardware constitution of the portable telephone 100.

The FIG. 8 shows an example of the hardware constitution of the portable telephone 100 according to the present embodiment. The portable telephone 100 includes a CPU peripheral unit including a CPU 1000, a RAM 1020, a graphic controller 1075 and a displaying apparatus 1080 as an example of the displaying unit 208, which are connected by a host controller 1082 and an input/output unit including a communication interface 1030 and a ROM 1010 which are connected to the host controller 1082 by an input/output controller 1084. In addition, the communication interface 1030 is an example of the transmitting and receiving unit 206 and the displaying unit 1080 is an example of the displaying unit 208.

The host controller 1082 connects the CPU 1000 and the graphic controller which access the RAM 1020 at a high transmission rate to the RAM 1020. The CPU 1000 operates based on the program stored in the ROM 1010 and RAM 1020 and controls each unit. Instead of this, the graphic controller 1075 may include a frame buffer storing the image data which is generated by the CPU 1000, etc, The input/output controller 1084 connects the communication interface 1030, which is an input/output apparatus at a high speed relatively, to the host controller 1082. The communication interface 1030 communicates with other apparatus via the network. Moreover, the ROM 1010 is connected to the input/output controller 1084. The ROM 1010 stores the boot program which the CPU 1000 performs in case of starting of the portable telephone 100 and the program depending on the hardware of the portable telephone 100, etc.

The computer program provided for the portable telephone 100 is installed in the portable telephone 100 via the network and is performed by the portable telephone 100. The computer program, which is installed in the portable telephone 100 and performed, makes the portable telephone 100 function as the imaging unit 202, the opposite party identifying unit 204, the transmitting and receiving unit 206, the displaying unit 208, the operation receiving unit 212, the image extracting unit 220, the image synthesizing unit 224, the background storing unit 226, the image recognition unit 230, the position measuring unit 240 and the clock unit 250.

The above mentioned computer program may be provided for the portable telephone 100 through the network from the storage device such as a hard disk or a RAM which is installed in the server system connected to the dedicated communication network or internet, moreover, maybe stored in a optical recording medium such as a flexible disk, a CD-ROM, a DVD or a PD, an magneto-optical recording medium such as a MD, a tape medium and an outside storage medium such as a semiconductor memory such as an IC card.

Although the present invention has been described by way of exemplary embodiments, it should be understood that those skilled in the art might make many changes and substitutions without departing from the spirit and the scope of the present invention which is defined only by the appended claims.

What is claimed is:

1. A video telephone for transmitting and receiving a voice and an image comprising:
   an imaging unit for picking up an image of a speaker who speaks by said video telephone;
   a displaying unit for displaying an image of said speaker that is picked up by said imaging unit before speaking is started when said video telephone receives an incoming call;
   a transmitting unit for transmitting an image which said imaging unit is picking up, together with a voice of said speaker to a video telephone of an opposite party in a state that said speaking is being made;
   an operation receiving unit for receiving a direction of on-hook operation for starting a call by predetermined button operation of the user, and
   a selecting unit for selecting whether only a voice call is to be made without transmitting an image which is picked up by said imaging unit or with transmitting said image, in a state that said displaying unit displays an image of said speaker.

2. A video telephone as claimed in claim 1, which is a portable telephone.

3. A video telephone as claimed in claim 1 which is foldable with said displaying unit located on its inner side,
   wherein said displaying unit displays an image of said speaker, which is picked up by said imaging unit, in response to opening said video telephone when said video telephone receives an incoming call in a folded state.

4. A video telephone as claimed in claim 1 further comprising an opposite party identifying unit for identifying whether an opposite party is a voice telephone for transmitting a voice without being accompanied by an image or a video telephone,
   wherein said displaying unit displays an image of said speaker, said image having been picked up by said imaging unit when said speaking was not made, in case that said opposite party identifying unit identifies said opposite party as a video telephone.

5. A video telephone as claimed in claim 1 further comprising an opposite party identification unit for identifying an opposite party,
   wherein said transmitting unit transmits an image which is picked up by said imaging unit to a video telephone of an opposite party on condition that an opposite party is a previously registered opposite party.

6. A video telephone as claimed in claim 1 further comprising a clock unit for confirming an incoming call time of said video telephone,
   wherein said transmitting unit transmits an image which is picked up by said imaging unit to a video telephone of an opposite party on condition that an incoming call time is a previously registered time band.

7. A video telephone as claimed in claim 1 further comprising a position measuring unit for measuring a present position of said video telephone,
   wherein said transmitting unit transmits an image which is picked up by said imaging unit to a video telephone of an opposite party on condition that a present position of an incoming call is within a previously registered area.

8. A video telephone as claimed in claim 1 further comprising
   an image recognizing unit for recognizing an image which is picked up by said imaging unit,
   wherein said transmitting unit transmits an image which is picked up by said imaging unit to a video telephone of an opposite party on condition that said image recognizing unit recognizes that the image, which is picked up by said imaging unit, includes a previously registered image.

9. A video telephone as claimed in claim 1 further comprising:
   an image extracting unit for extracting an image of said speaker from an image which is picked up by said imaging unit;
   a background storing unit for storing a background image which is to be synthesized with said image of said speaker; and
   an image synthesizing unit for generating a synthesized image in which an image of said speaker extracted by said image extracting unit is synthesized with said background image stored by said background storing unit,
   wherein said displaying unit displays said synthesized image before starting said speaking,
   wherein said transmitting unit transmits said synthesized image to a video telephone of said opposite party in a state that said call is being made.

10. A video telephone as claimed in claim 9 further comprising
    an opposite party identifying unit for identifying an opposite party,
    wherein said image synthesizing unit generates said synthesized image if an opposite party is one previously registered.

11. A video telephone as claimed in claim 9 further comprising a clock unit for confirming an incoming call time of said video telephone,
    wherein said image synthesizing unit generates said synthesized image in case that an incoming call time is a previously registered time band.

12. A video telephone as claimed in claim 9 further comprising
    a position measuring unit for measuring a present position of said video telephone,
    wherein said image synthesizing unit generates said synthesized image if a present position of an incoming call is within a previously registered area.

13. A video telephone as claimed in claim 9 further comprising an image recognizing unit for recognizing an image which is picked up by said imaging unit, wherein said image synthesizing unit generates said synthesized image if said image recognizing unit recognizes that the image, which is picked up by said imaging unit, includes a previously registered image.

14. A video telephone as claimed in claim 1 further comprising a background storing unit for previously registering a feature of an image which the user does not want to transmit to a terminal of an opposite party.

15. A computer program which makes a video telephone operate, said video telephone transmitting and receiving a voice and an image, wherein said computer program makes said video telephone function as an imaging unit for picking up an image of a speaker who speaks by said video telephone; a displaying unit for displaying an image of said speaker that is picked up by said imaging unit before speaking is started when said video telephone receives an incoming call; a transmitting unit for transmitting an image which said imaging unit is picking up, together with a voice of said speaker to a video telephone of an opposite party in a state that said speaking is being made; an operation receiving unit for receiving a direction of on-hook operation for starting a call by predetermined button operation of the user; and a selecting unit for selecting whether only a voice call is to be made without transmitting an image which is picked up by said imaging unit or with transmitting said image, in a state that said displaying unit displays an image of said speaker.

* * * * *